(12) United States Patent
Novick

(10) Patent No.: US 6,980,513 B2
(45) Date of Patent: Dec. 27, 2005

(54) METHODS AND APPARATUS FOR THE FAIR ALLOCATION OF BANDWIDTH AMONG MCR AND BEST EFFORT SERVICE CONNECTIONS IN AN ATM SWITCH

(75) Inventor: Ronald P. Novick, Orange, CT (US)

(73) Assignee: TranSwitch Corporation, Shelton, CT (US)

( * ) Notice: Subject to any disclaimer, the term of this patent is extended or adjusted under 35 U.S.C. 154(b) by 932 days.

(21) Appl. No.: 09/961,837

(22) Filed: Sep. 24, 2001

(65) Prior Publication Data

US 2003/0058869 A1    Mar. 27, 2003

(51) Int. Cl.[7] .............................................. G01R 31/08
(52) U.S. Cl. ..................... 370/230; 370/252; 370/295.4
(58) Field of Search ..................... 370/395.4, 395.41, 370/395.42, 395.43, 412, 468, 230, 230.1, 370/252, 253

(56) References Cited

U.S. PATENT DOCUMENTS

| | | | |
|---|---|---|---|
| 5,150,358 A | 9/1992 | Punj et al. | 370/418 |
| 5,231,633 A | 7/1993 | Hluchyi et al. | 370/429 |
| 5,280,475 A | 1/1994 | Yanagi et al. | 370/399 |
| 5,339,332 A | 8/1994 | Kammerl | 375/225 |
| 5,381,407 A | 1/1995 | Chao | 370/233 |
| 5,400,329 A | 3/1995 | Tokura et al. | 370/232 |
| 5,448,567 A | 9/1995 | Dighe et al. | 370/233 |
| 5,497,375 A | 3/1996 | Hluchyi | 370/232 |
| 5,499,238 A | 3/1996 | Shon | 370/399 |
| 5,504,744 A | 4/1996 | Adams et al. | 370/468 |
| 5,515,359 A | 5/1996 | Zheng | 370/230 |
| 5,559,798 A | 9/1996 | Clarkson et al. | 370/468 |
| 5,561,791 A | 10/1996 | Mendelson et al. | 709/233 |
| 5,787,071 A | 7/1998 | Basso et al. | 370/231 |
| 5,889,761 A | 3/1999 | Yamato | 370/231 |
| 5,940,370 A | 8/1999 | Curtis et al. | 370/231 |
| 6,115,358 A | 9/2000 | Jones | 370/232 |
| 6,327,246 B1 | 12/2001 | Jones | 370/232 |

*Primary Examiner*—Chi Pham
*Assistant Examiner*—Blanche Wong
(74) *Attorney, Agent, or Firm*—Gordon & Jacobson, P.C.

(57) ABSTRACT

Methods for allocating bandwidth among MCR and best effort connections include listing MCR connections in an MCR service list and best efforts connection in a best efforts (BE) service list. Assigning an MCR value to each MCR connection and setting a Cell Count Register (CCR) with it. During a service interval, dequeueing each MCR connection queue in round robin fashion according to the MCR service list and decrementing the associated CCR. If the CCR reaches zero before the end of the service interval and there are still cells in the queue, the connection is moved from the MCR service list to the BE service list for the remainder of the service interval. If the CCR reaches zero before the end of the service interval and/or there are no cells remaining in the queue, the connection is removed from the MCR service list. If all of the cell counts reach zero and/or if all of the MCR queues become empty before the end of the service interval, the connections on the BE service list are serviced by a separate scheduler. At the end of the service interval, the CCRs are reinitialized and the MCR connections which were moved to the BE service list are moved back to the MCR service list.

13 Claims, 2 Drawing Sheets

METHODS AND APPARATUS FOR THE FAIR ALLOCATION OF BANDWIDTH AMONG MCR AND BEST EFFORT SERVICE CONNECTIONS IN AN ATM SWITCH

BACKGROUND OF THE INVENTION

1. Field of the Invention

The invention relates to the allocation of bandwidth in an ATM (Asynchronous Transfer Mode) network. More particularly, the invention relates to methods and apparatus for the fair allocation of bandwidth among minimum cell rate (MCR) and best effort service connections.

2. State of the Art

Perhaps the most awaited, and now fastest growing technology in the field of telecommunications is known as Asynchronous Transfer Mode (ATM) technology. ATM was designed to be a carrier of integrated traffic, e.g. voice, data, and video. ATM utilizes fixed length packets (called "cells") of 53 octets (5 octets header and 48 octets payload). Current ATM service is offered in different categories according to a user's needs. These categories include, in order of priority: constant bit rate (CBR), variable bit rate-real time (VBR or VBR-rt), variable bit rate-non-real time (VBR-nrt), guaranteed frame rate (GFR), available bit rate (ABR), unspecified bit rate plus (UBR+), and unspecified bit rate (UBR). CBR and VBR-rt are "real-time" categories suitable for streaming video and voice connections. These categories are given the highest priority in the ATM network. The other five categories are considered "non-real-time". For GFR, ABR, and UBR+, users pay for a minimum cell rate (or guaranteed frame rate) which is an average rate taken over time during which there may be bursty periods and periods of latency. For convenience, these four categories are referred to as MCR (minimum cell rate) services. For UBR, no minimum bandwidth is guaranteed. UBR connections are serviced last if there is any available bandwidth after servicing all of the higher categories of service. UBR, is referred to as "best effort" service.

One of the most difficult aspects of implementing traffic control in an ATM network is the fair allocation of available bandwidth that is not required by high priority connections or to meet MCR requirements of low priority traffic. Presently, there are several different ways to apportion extra bandwidth.

The simplest way is to put all the GFR, ABR, and UBR+ traffic in a single queue and allocate priority to the queue higher than UBR traffic but lower than real time traffic. This method does not guarantee the MCR traffic the "contracted-for" minimum bandwidth and does not assure that best effort connections are allocated bandwidth fairly.

Another method for allocating bandwidth is to provide a separate queue for each connection (per-VC queuing) and service the queues in a round robin-fashion. This guarantees fairness but does not, by itself, guarantee the MCR traffic the "contracted-for" minimum bandwidth.

Still another method is to provide per-VC queuing, shape the individual connections, and service the queues using a best effort round robin mechanism. This method provides the individual bandwidth guarantees to MCR connections and provides a fair allocation of remaining bandwidth to the best effort connections. However, the shaping mechanism is typically shared among all service categories, including real-time categories.

"Overbooking" is the allocation of more bandwidth than is actually available to MCR and best effort connections in order to take advantage of statistical multiplexing. Overbooking would adversely affect the real-time traffic in this single level type of scheduler and thus must be avoided in this type of implementation.

SUMMARY OF THE INVENTION

It is therefore an object of the invention to provide methods and apparatus for the allocation of bandwidth among MCR and best effort service connections in an ATM switch.

It is also an object of the invention to provide methods and apparatus for the allocation of bandwidth among MCR and best effort service connections in an ATM switch which meets the contracted for minimum bandwidth requirements of MCR connections.

It is another object of the invention to provide methods and apparatus for the allocation of bandwidth among MCR and best effort service connections in an ATM switch which fairly allocates remaining bandwidth among best effort connections.

It is a further object of the invention to provide methods and apparatus for the allocation of bandwidth among MCR and best effort service connections in an ATM switch which enables overbooking without adversely affecting high priority traffic and which compensates MCR connections that are adversely affected by statistical multiplexing (overbooking) practices.

In accord with these objects which will be discussed in detail below, the apparatus of the present invention includes memory for maintaining queues, registers and connection lists, a high priority scheduler, a low priority scheduler, and a service interval timer/counter. According to the methods of the invention, MCR connections are listed in an MCR service list and best efforts connections are listed in a best effort (BE) service list. Each MCR connection and best effort connection is provided with a queue. Each MCR connection queue has an MCR register and Cell Count Register associated with it. Upon initialization, each MCR register is set to a value based on the guaranteed MCR for the MCR connections and the available bandwidth. Each Cell Count Register is then initialized to the value of its corresponding MCR register. The service interval timer/counter is started. During the service interval, the High priority scheduler dequeues each MCR connection queue in round robin fashion according to the MCR service list. Every time a cell is released from a queue, the Cell Count Register associated with the queue is decremented. If the Cell Count Register for a queue reaches zero before the end of the service interval and there are still cells in the queue, the connection is moved from the MCR service list to the BE service list for the remainder of the service interval. If the Cell Count Register for a queue reaches zero before the end of the service interval and/or there are no cells remaining in the queue, the connection is removed from the MCR service list. If all of the cell counts reach zero and/or if all of the MCR queues become empty before the end of the service interval, the connections on the BE service list are serviced by the low priority scheduler in a weighted fashion allocating bandwidth among best effort connections and MCR connections which have met or exceeded their MCR for the service interval. At the end of the service interval, the cell count registers are reinitialized and the MCR connections which were moved to the BE service list are moved back to the MCR service list. The service interval timer/counter is restarted and the process is repeated. According to an optional step in the method, the Cell Count registers are increased by whatever value was remaining at the end of the last service interval. In order to stagger the updating of Cell Count registers, a time stamp or service interval counter is implemented whereby the Cell Counts are updated the first time the associated queue is serviced per time interval.

The methods and apparatus of the invention allocate bandwidth fairly, meet the MCR requirements of MCR connections, and compensate for overbooking. The invention is typically used in an ATM switch which carries high priority traffic as well as MCR and best effort traffic.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
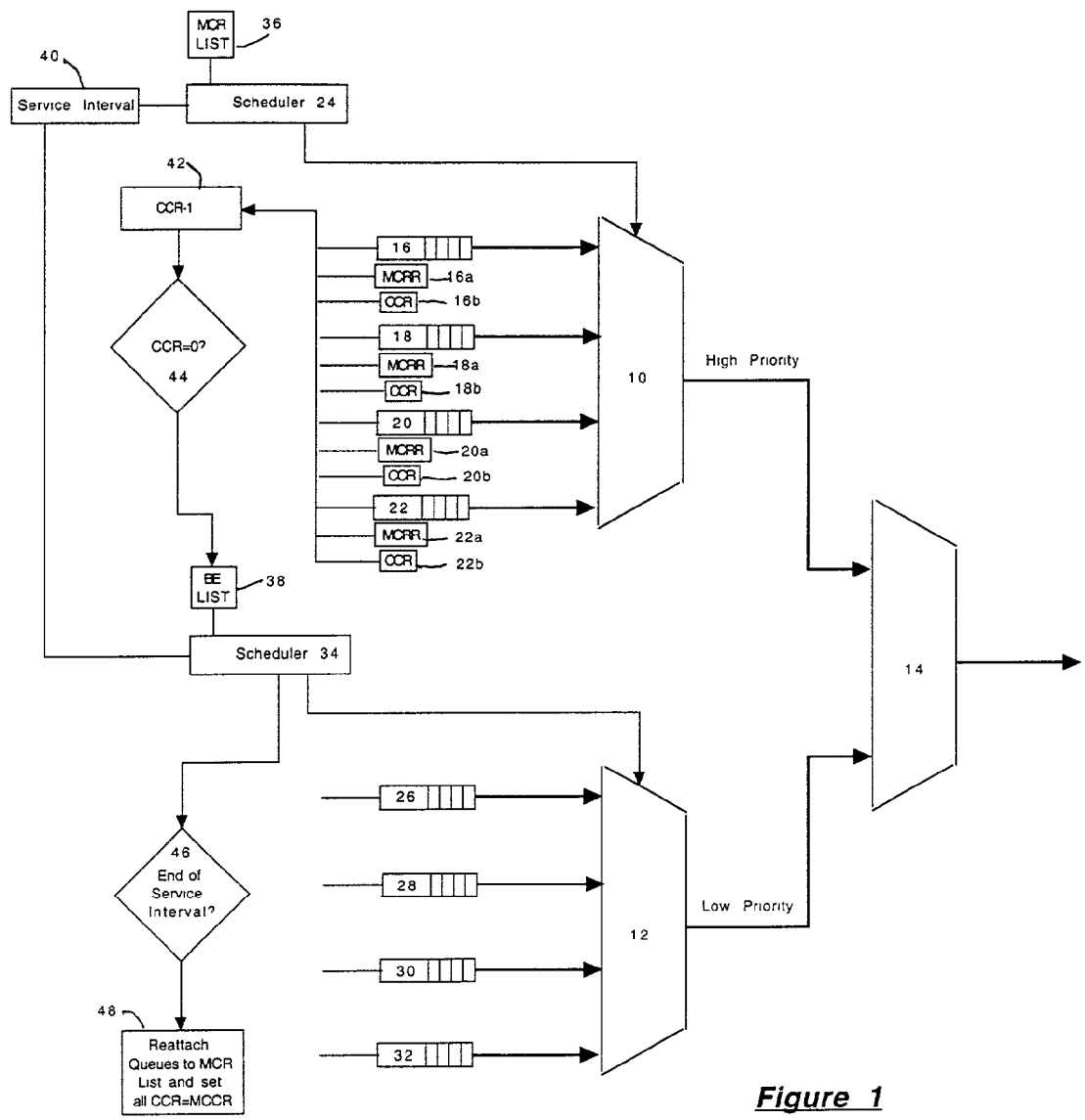
FIG. 1 is a high level schematic illustration of an apparatus according to the invention.

Turning now to FIG. 1, an exemplary apparatus according to the invention includes a high priority multiplexer 10, a low priority multiplexer 12, and a mixed traffic multiplexer 14, The high priority multiplexer 10 is associated with a plurality of high priority queues 16, 18, 20, 22 and a high priority scheduler 24. The low priority multiplexer 12 is associated with a plurality of low priority queues 26, 28, 30, 32 and a low priority scheduler 34.

According to the invention, each high priority queue is associated with a minimum cell count register MCRR 16a, 18a, 20a, 22a and a cell count register CCR 16b, 18b, 20b, 22b. The high priority scheduler 24 is associated with an MCR service list 36 and the low priority scheduler 34 is associated with a Best Effort (BE) service list 38. Both schedulers are associated with a single service interval timer/counter 40. According to a presently preferred embodiment, the queues, registers, and lists are dynamically provided in internal memory and registers. It will be appreciated however, that the queues, registers, and lists may be provided in discrete memory devices. The number of queues and associated registers will be determined by the number of MCR and BE connections being serviced at any particular time. It will be appreciated that in an ATM switch incorporating the invention, other classes of traffic may be present and routed through the mixed traffic multiplexer 14.

As described in more detail below with reference to FIG. 2, the invention also includes means 42 for decrementing the CCR registers, means 44 for determining when a CCR=0 and for transferring the associated connection from the MCR list 36 to the BE list 38, means 46 for determining the end of a service interval, and means 48 for resetting the CCR registers and for transferring the MCR connections back to the MCR list.

Figure 2:
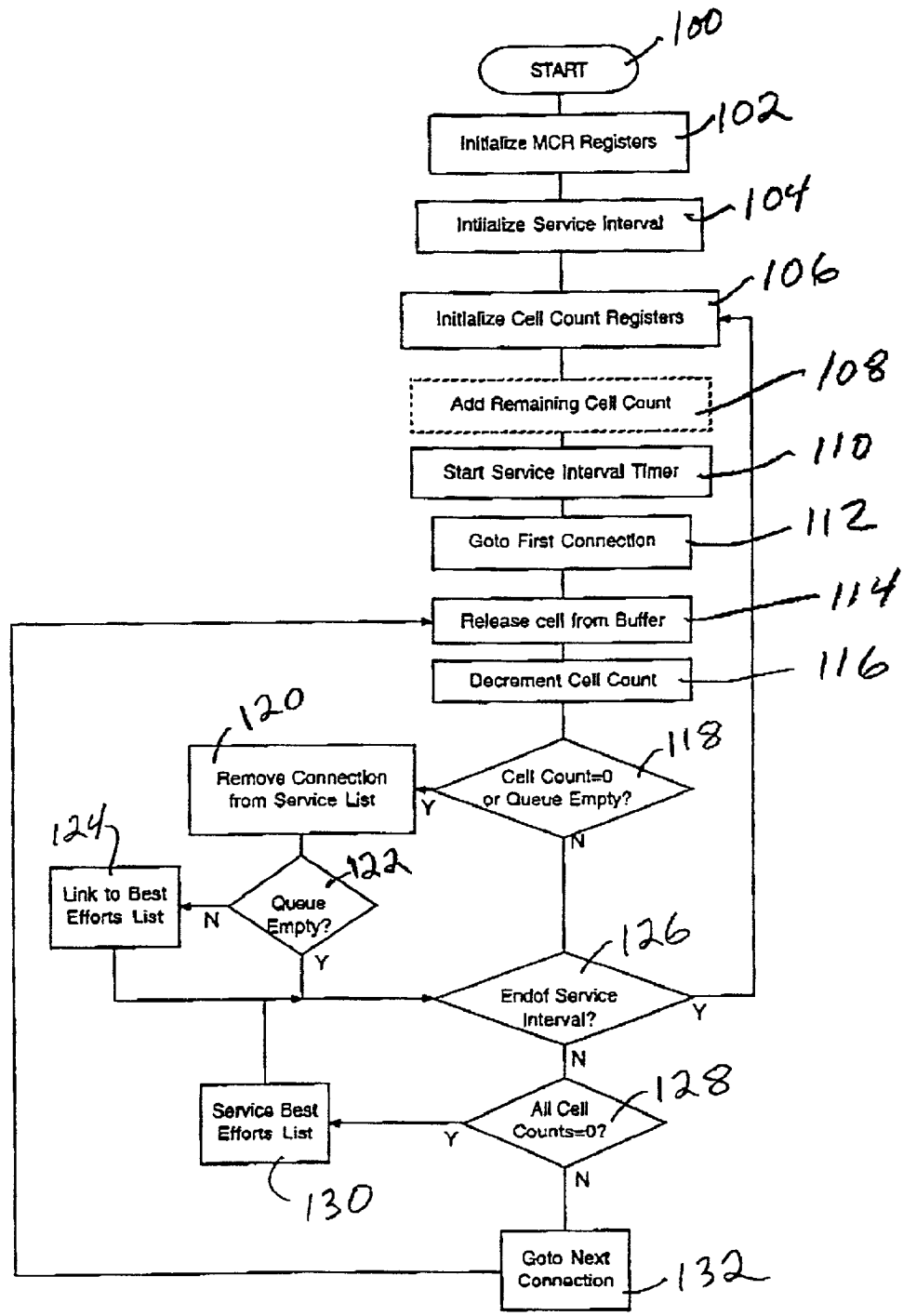
FIG. 2 is a simplified flowchart illustrating the methods of the invention.

FIG. 2 is a simplified flowchart illustrating the methods of the invention. Those skilled in the art will appreciate that MCR and BE connections will be setup and torn down over time. Though not shown in FIG. 2, as MCR and BE connections are setup, queues will be created/assigned to the connections and, in the case of MCR queues, registers will be created/assigned. As the connections are torn down, the queues and registers will be freed up. When a connection is setup, and a queue is created for it, it is added to the appropriate service list 36 or 38. More particularly, the MCR connection queues are listed in the MCR service list 36 and the BE connection queues are listed in the BE service list 38. When a connection is torn down, and the queue assigned to it is freed, the connection queue is removed from the list.

Referring now to FIG. 2, starting at 100 when MCR connections are queued, the MCRR associated with each MCR queue is assigned a cell count value at 102 and a service interval is initialized at 104. The service interval value is based on the contracted-for MCR of the active MCR connections and the available bandwidth in the switch. The service interval can be a total number of cells or a time period and can be pre-programmed or calculated based on the available bandwidth. At the beginning of a service interval, all of the cell count registers CCRs are initialized to the value in their corresponding MCRR at 106. Step 108 shown in FIG. 2 is an optional step which is better understood during the second iteration of the method after all of the other steps in FIG. 2 have been explained.

After the service interval timer/counter is started at 110, the high priority scheduler (24 in FIG. 1) goes to the first non-empty connection queue in the MCR list (36 in FIG. 1) at 112 and releases a cell from the queue at 114. When the cell is released, the count of the CCR is decremented by one at 116. It is then determined at 118 whether the cell count of the CCR is zero or whether the queue is empty. If the cell count is zero or the queue is empty, the connection que is removed from the MCR service list at 120. If it is determined that the queue is not empty at 122, the connection queue is moved from the MCR service list to the BE service list (38 in FIG. 1) at 124. If the service interval has not run out as determined at 126 and it is determined at 128 that all CCR counts are zero, servicing of the BE service list is performed by the low priority scheduler (34 in FIG. 1) at 130 for the duration of the service interval. If the service interval has not run out, the high priority scheduler (24 in FIG. 1) goes to the next connection queue in the MCR service list (36 in FIG. 1) at 132 and repeats the dequeuing process described above with reference to numerals 114 et seq.

When the service interval has run out as determined at 126, the CCRs are reinitialized with the values stored in their associate MCRRS, and the MCR queues which were moved to the BE service list at 124 are moved back to the MCR service list at 106. According to an optional step at 108, those CCRs whose counts were not run to zero during the last service interval are incremented by their previously remaining cell count values. The optional step at 108 allow MCR connections which fell short of meeting their MCR during the last service interval to carry forward a credit to future service intervals with the expectation that they will average to their MCR over time. This compensates for overbooking.

In practice, the resetting of all the CCRs in one step at 106 may be too time consuming and cause an undue delay in the servicing of the queues. Accordingly, according to an alternate preferred embodiment of the invention, the CCRs are set the first time a queue is serviced during a service interval, for example between steps 112 and 114 and between steps 132 and 114. To facilitate this system it may be desirable to number or time stamp the service intervals to provide an easy way of determining when a queue is first serviced in a service interval.

There have been described and illustrated herein several embodiments of a methods and apparatus for the fair allocation of bandwidth among MCR and best effort service connections in an ATM switch. While particular embodiments of the invention have been described, it is not intended that the invention be limited thereto, as it is intended that the invention be as broad in scope as the art will allow and that the specification be read likewise. Those skilled in the art will appreciate that the techniques described herein could be applied in other types of packet switches having classes of service such as Diffserv. In Diffserve the class of service corresponding to ATM MCR is called CIR. Thus, as used in the claims, the terms ATM, MCR, and best effort are intended to include corresponding terms in other types of packet switches which have classes of service. It will therefore be appreciated by those skilled in the art that yet other modifications could be made to the provided invention without deviating from its spirit and scope as so claimed.

What is claimed is:

1. A method for allocating bandwidth among minimum cell rate (MCR) connections and best effort connections in an ATM switch, said method comprising:
   a) associating each MCR connection with an individual queue;
   b) associating each queue with a cell count register and a MCR register;
   c) setting the values of the MCR registers based on guaranteed bandwidth of all the MCR connections and the presently available bandwidth of the associated port in the switch;
   d) setting the values of each cell count register based on its associated MCR register value;
   e) listing all of the MCR connection queues in an MCR service list;
   f) dequeuing cells from the MCR connection queues in a round robin fashion according to the MCR service list during a service interval;
   g) decrementing cell count registers as associated queues are dequeued; and
   h) removing MCR connection queues from the MCR service list when the queues become empty or the cell count register for the queue goes to zero during the service interval whichever occurs first.

2. A method according to claim 1, further comprising:
   i) listing all of the best efforts connections in a best effort service list; and
   j) moving MCR connection queues from the MCR service list to the best effort service list for the duration of a service interval if the MCR connection queue is not empty but its cell count register goes to zero during the service interval.

3. A method according to claim 2, further comprising:
   k) servicing the queues in the best effort service list during the remaining portion of the service interval after all of the MCR queue cell count registers have gone to zero.

4. A method according to claim 3, further comprising:
   l) after the service interval expires, resetting the cell count registers and repeating steps a–k.

5. A method according to claim 4, wherein:
   said step of resetting the cell count registers includes adding the associated MCR register value to the value remaining in the cell count register at the end of the last service interval.

6. A method according to claim 4, wherein:
   said step of resetting the cell count registers is performed for each cell count register the first time the queue associated with the cell count register is serviced in a service interval.

7. An apparatus for allocating bandwidth among minimum cell rate (MCR) and best effort connections in an ATM switch, said apparatus comprising:
   a) a plurality of MCR queues, one for each active MCR connection;
   b) a plurality of cell count register, one for each MCR queue;
   c) a plurality of MCR registers, one for each MCR queue;
   d) an MCR scheduler coupled to said queues and said registers;
   e) an MCR service list coupled to said MCR scheduler, wherein
      said MCR scheduler sets the values of the MCR registers based on guaranteed bandwidth of all active MCR connections and presently available bandwidth in the switch,
      said MCR scheduler sets the values of each cell count register based on its associated MCR register value;
      said MCR scheduler lists all of the MCR connection queues in the MCR service list;
      said MCR scheduler dequeues cells from the MCR connection queues in a round robin fashion according to the MCR service list during a service interval;
      said MCR scheduler decrements cell count registers as associated queues are dequeued; and
      said MCR scheduler removes MCR connection queues from the MCR service list when the queue becomes empty or the cell count register for the queue goes to zero during the service interval whichever occurs first.

8. An apparatus according to claim 7, further comprising:
   i) a best effort service list coupled to said MCR scheduler, wherein
      said MCR scheduler moves MCR connection queues from the MCR service list to the best effort service list for the duration of a service interval if the MCR connection queue is not empty but its cell count register goes to zero during the service interval.

9. An apparatus according to claim 8, wherein:
   said MCR scheduler indicates servicing the queues in the best effort service list during the remaining portion of the service interval after all of the MCR queue cell count registers have gone to zero.

10. An apparatus according to claim 8, wherein:
    after the service interval expires, the MCR scheduler resets the cell count registers and begins a new service interval.

11. An apparatus according to claim 10, wherein:
    said MCR scheduler resets the cell count registers by adding the associated MCR register value to the value remaining in the cell count register at the end of the last service interval.

12. An apparatus according to claim 10, wherein:
    said MCR scheduler resets each cell count register the first time the queue associated with the cell count register is serviced in a service interval.

13. A method for allocating bandwidth among high priority connections and low priority connections in a packet switch, said method comprising:
    a) associating each high priority connection with an individual queue;
    b) associating each queue with a packet count register and a minimum packet rate register;
    c) setting the values of the minimum packet rate registers based on guaranteed bandwidth of all the high priority connections and the presently available bandwidth of the associated port in the switch;
    d) setting the values of each packet count register based on its associated minimum packet rate register value;

e) listing all of the high priority connection queues in a high priority service list;
f) dequeuing packets from the high priority connection queues in a round robin fashion according to the high priority service list during a service interval;
g) decrementing packet count registers as associated queues are dequeued; and
h) removing high priority connection queues from the high priority service list when the queues become empty or the packet count register for the queue goes to zero during the service interval whichever occurs first.

* * * * *